Sept. 5, 1950  D. L. PETTIT  2,521,251
SIGHT TUBE FOR LAMPS
Filed Oct. 25, 1948

Inventor

Doyt L. Pettit

By *Clarence A. O'Brien and Harvey B. Jacobson*
Attorneys

Patented Sept. 5, 1950

2,521,251

UNITED STATES PATENT OFFICE 2,521,251

SIGHT TUBE FOR LAMPS

Doyt L. Pettit, Rock River, Wyo.

Application October 25, 1948, Serial No. 56,404

1 Claim. (Cl. 240—10.6)

The present invention relates to new and useful improvements in sighting attachments for lamps, such as flashlights, search lights, as well as other types of lamps, and more particularly to a tube supported in a position parallel to the beam of light to center the focal point of the eye of a person positioned at the rear end of the tube on an object in the path of the beam of light.

An important object of the invention is to provide a sighting tube attachment for flashlights and other light beam-projecting lamps which will not interfere with the normal use of the lamp.

A further object of the invention is to provide a device of this character of simple and practical construction, which is efficient and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
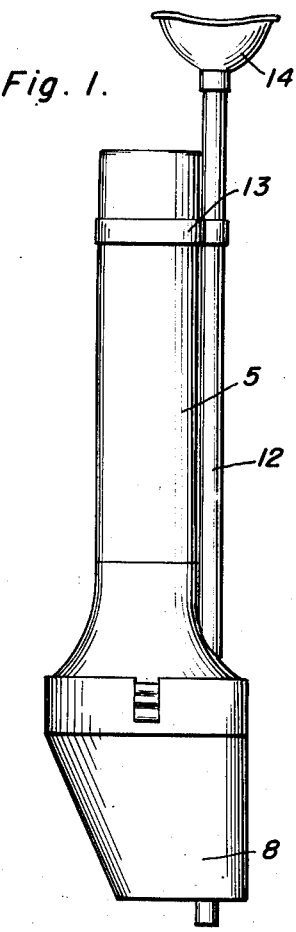
Figure 1 is a side elevational view showing the sight tube attached in position to a flashlight.
Figure 2:
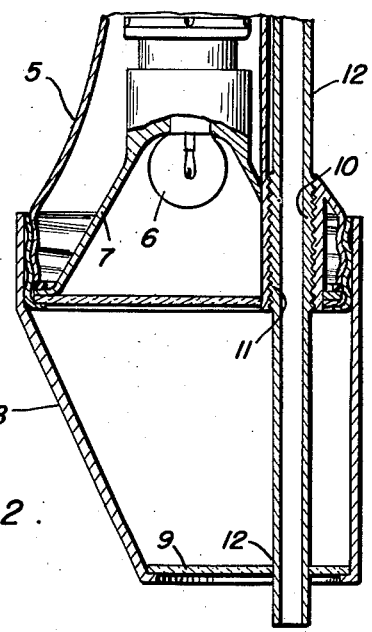
Figure 2 is an enlarged fragmentary longitudinal sectional view of the reflector for the flashlight.
Figure 3:
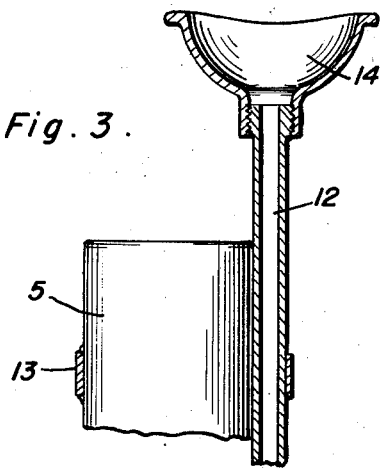
Figure 3 is an enlarged fragmentary longitudinal sectional view of the rear end of the sight tube.
Figure 4:
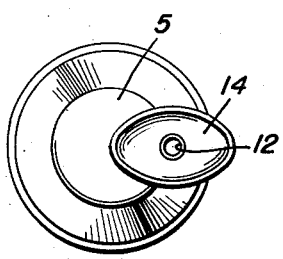
Figure 4 is a rear end elevational view thereof.

Referring now to the drawing in detail wherein, for the purpose of illustration, I have disclosed a preferred embodiment of the invention, the numeral 5 designates a flashlight housing generally, and to the front end of which is mounted the lamp 6 in a reflector 7.

A tapered shield 8 is suitably secured to the front end of the flashlight, preferably by threadedly attaching the shield thereto, the outer end of the shield being provided with a window 9. Shield 8 is tapered at one side to reflect light toward the axis of the tube 12.

A threaded opening 10 is formed longitudinally in the reflector adjacent one edge thereof and in which the threaded portion 11 of a tube 12 is secured with the front end of the tube extending forwardly through an opening 12 in the window 9 and the tube being secured against the side of the flashlight 5 by a clamp 13. The rear end of tube 12 projects rearwardly of the flashlight and to which is secured a substantially cup-shaped eye shield 14.

The eye shield 14 is constructed of any suitable material which will not injure the eye when placed against the shield and is shaped to exclude all side lights from the eye when the eye is placed firmly against the shield.

In the use of the invention, the lamp 6 is energized in the usual manner to project its beam forwardly through the shield 8 and window 9 and the eye of a person is placed firmly against the eye shield 14, whereupon the focal point of the eye may be centered on an object in the path of the light beam.

It will be apparent that the device may be used for locating objects in dark and inaccessible places and, when attached to a high powered search light, may be used as an airplane spotter or for other purposes. It will also be apparent that the lamp and the tube may be manufactured as a unit or as an assembled product.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A sighting device comprising the combination of a tubular lamp housing including a reflector, a hollow shield secured to the front end of the housing and projecting forwardly of the reflector, a window at the front end of the shield, and a sighting tube open at each end and projecting through the reflector, as well as through the shield forwardly and rearwardly thereof and at one side of a lamp supported in the reflector and parallel to a beam of light projected therefrom, said tube being positioned eccentrically in the reflector and shield, and said shield tapering at one side to reflect light toward the axis of the tube.

DOYT L. PETTIT.

REFERENCES CITED

The following references are of record in the file of this patent:

UNITED STATES PATENTS

| Number | Name | Date |
| --- | --- | --- |
| 536,759 | Potter | Apr. 2, 1895 |
| 1,191,528 | Midgley | July 18, 1916 |
| 1,542,011 | Simpson | June 16, 1925 |
| 1,835,938 | Ewen | Dec. 8, 1931 |
| 2,092,672 | Hyatt | Sept. 7, 1937 |
| 2,192,791 | Kendall | Mar. 5, 1940 |

FOREIGN PATENTS

| Number | Country | Date |
| --- | --- | --- |
| 92,569 | Sweden | June 14, 1938 |